US012059901B2

(12) United States Patent
Hirabayashi et al.

(10) Patent No.: US 12,059,901 B2
(45) Date of Patent: Aug. 13, 2024

(54) LIQUID DISCHARGE HEAD, HEAD MODULE, HEAD DEVICE, LIQUID DISCHARGE DEVICE, AND LIQUID DISCHARGE APPARATUS

(71) Applicants: Takuma Hirabayashi, Kanagawa (JP); Hiromichi Hirano, Kanagawa (JP); Ryohta Yoneta, Kanagawa (JP); Toshiaki Masuda, Kanagawa (JP)

(72) Inventors: Takuma Hirabayashi, Kanagawa (JP); Hiromichi Hirano, Kanagawa (JP); Ryohta Yoneta, Kanagawa (JP); Toshiaki Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 3 days.

(21) Appl. No.: 17/567,893

(22) Filed: Jan. 4, 2022

(65) Prior Publication Data

US 2022/0242123 A1 Aug. 4, 2022

(30) Foreign Application Priority Data

Jan. 29, 2021 (JP) ................................ 2021-013477
Oct. 11, 2021 (JP) ................................ 2021-166829

(51) Int. Cl.
*B41J 2/16* (2006.01)

(52) U.S. Cl.
CPC .................................... *B41J 2/161* (2013.01)

(58) Field of Classification Search
None
See application file for complete search history.

(56) References Cited

U.S. PATENT DOCUMENTS

2017/0306471 A1 10/2017 Abe et al.
2018/0117915 A1 5/2018 Takeuchi et al.
2019/0224974 A1* 7/2019 Kihira ................. B41J 2/14274
2020/0031113 A1 1/2020 Kondo et al.

FOREIGN PATENT DOCUMENTS

JP 7-117224 5/1995
JP 2003-094644 4/2003
JP 2010-280225 12/2010
JP 2012-000785 1/2012
JP 2018-094860 6/2018

* cited by examiner

*Primary Examiner* — Erica S Lin
(74) *Attorney, Agent, or Firm* — XSENSUS LLP

(57) ABSTRACT

A liquid discharge head having a nozzle substrate including a nozzle from which a liquid is discharged in a liquid discharge direction, a pressure chamber communicating with the nozzle, a diaphragm defining a part of wall of the pressure chamber, and a pressure generator on a first surface of the diaphragm opposite to a second surface of the diaphragm facing the pressure chamber, the pressure generator configured to deform the diaphragm. A gap between a first line and a second line is 40 μm or less in a direction perpendicular to the liquid discharge direction, where the first line extends, in the liquid discharge direction, from a displacement center at which the diaphragm deforms with a maximum displacement amount, and the second line extends from a central position of the nozzle in the liquid discharge direction.

11 Claims, 8 Drawing Sheets

COMPARATIVE EXAMPLE

COMPARATIVE EXAMPLE

LIQUID DISCHARGE HEAD, HEAD MODULE, HEAD DEVICE, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-013477, filed on Jan. 29, 2021, in the Japan Patent Office, and Japanese Patent Application No. 2021-166829, filed on Oct. 11, 2021, in the Japan Patent Office the entire disclosure of which are hereby incorporated by reference herein.

BACKGROUND

Technical Field

An aspect of the present disclosure relates to a liquid discharge head, a head module, a head device, a liquid discharge device, and a liquid discharge apparatus.

Related Art

An inkjet printer as an example of a liquid discharge apparatus discharges a minute liquid droplet of ink from a liquid discharge head onto a recording medium to form an image pattern on the recording medium.

The liquid discharge head includes a pressure generator that applies a discharge pressure to a liquid in a liquid chamber communicating with a nozzle. The pressure generator may include a piezoelectric element including a thin-film piezoelectric body, for example. In a structure in which a piezoelectric element and a diaphragm are bonded to each other, a voltage is applied between electrodes formed on both surfaces of a thin-film piezoelectric body so that the thin-film piezoelectric body tends to contract in a surface direction. The diaphragm does not contract so that a bending deformation occurs. The liquid discharge head of the above type bends a wall of the liquid chamber facing the nozzle to increase or decrease a volume of the liquid chamber to generate pressure in the liquid chamber to discharge a liquid in the liquid chamber from the nozzle.

A displacement amount of the diaphragm that receives a force from the piezoelectric element is not uniform. Thus, a direction of the pressure applied to the liquid (ink) filled in the liquid chamber is not perpendicular to a surface of the diaphragm as a whole. Therefore, even if the nozzle is vertically formed in the wall of the liquid chamber, the liquid (ink) droplet is not discharged from the nozzle in a vertical direction with respect to the liquid discharge head. Thus, a problem occurs in which the liquid (ink) is discharged in an inclined state and a printing position is deviated. A bending of the discharged liquid (ink) droplet cause a deviation in a landing position of the liquid (ink) droplet on the recording medium and a deviation in the printing position (printing gap). An increase in the deviation in the printing position (printing gap) affects printing quality.

SUMMARY

A liquid discharge head having a nozzle substrate including a nozzle from which a liquid is discharged in a liquid discharge direction, a pressure chamber communicating with the nozzle, a diaphragm defining a part of wall of the pressure chamber, and a pressure generator on a first surface of the diaphragm opposite to a second surface of the diaphragm facing the pressure chamber, the pressure generator configured to deform the diaphragm. A gap between a first line and a second line is 40 μm or less in a direction perpendicular to the liquid discharge direction, where the first line extends, in the liquid discharge direction, from a displacement center at which the diaphragm deforms with a maximum displacement amount, and the second line extends from a central position of the nozzle in the liquid discharge direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
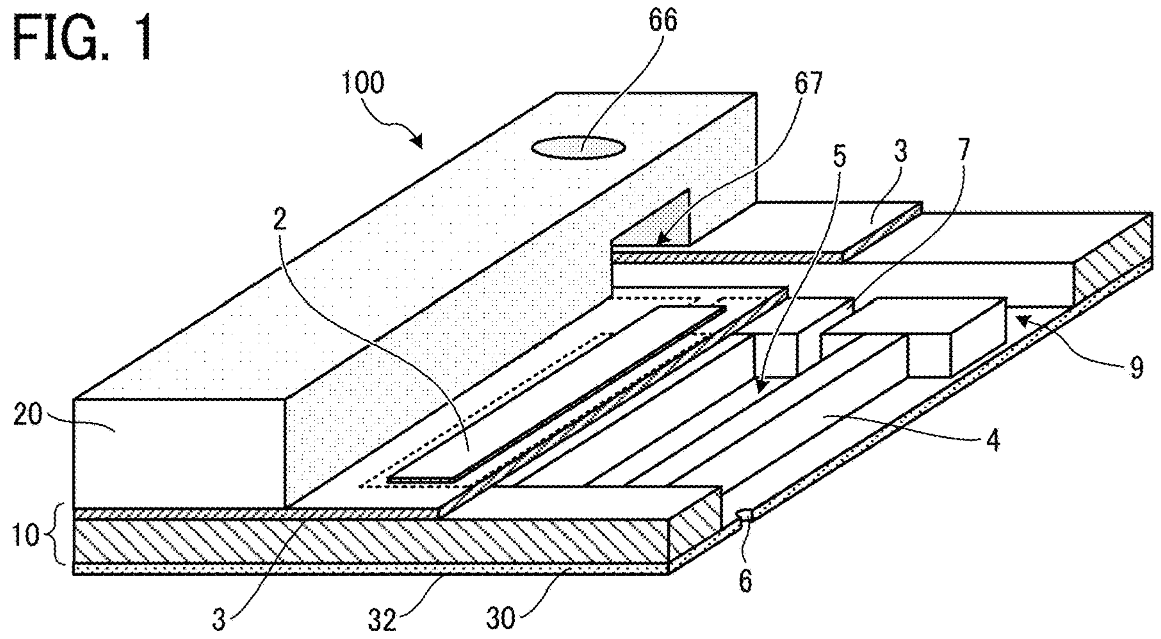
FIG. 1 is a perspective view of a liquid discharge head according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Hereinafter, a liquid discharge head, a head module, a liquid discharge device, and a liquid discharge apparatus according to a first embodiment of the present disclosure is described with reference to the drawings. Note that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are demonstrated.

[Liquid Discharge Head]

A basic configuration of a liquid discharge head 100 according to the first embodiment of the present disclosure is described below with reference to FIGS. 1 to 3. Hereinafter, the liquid discharge head 100 is simply referred to as a "head 100".

FIG. 1 is a perspective view of the head 100 according to the first embodiment of the present disclosure.

Figure 2:
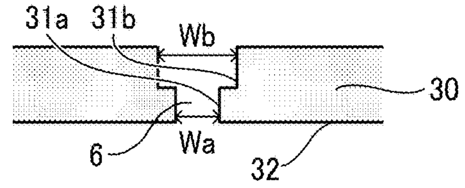
FIG. 2 is a schematic cross-sectional view of a nozzle substrate and a nozzle.
Figure 3:
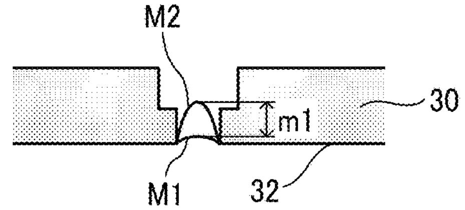
FIG. 3 is a cross-sectional side view of the nozzle substrate including the nozzle illustrating a meniscus in the nozzle.

FIGS. 2 and 3 are cross-sectional views of nozzles 6 of a nozzle substrate 30 (nozzle plate).

The bead 100 includes an actuator substrate 10, sub-frame substrate 20, and the nozzle substrate 30. The head 100 illustrated in FIG. 1 is of a side shooter type that discharges a liquid from nozzles 6 formed in a nozzle surface 32 of the nozzle substrate 30. The nozzle surface 32 is a surface of the nozzle substrate 30.

Further, the nozzles 6 are formed in the nozzle substrate 30 at positions corresponding to the pressure chambers 5, respectively.

The actuator substrate 10 includes a piezoelectric element 2 and a diaphragm 3. The piezoelectric element 2 generates energy to discharge the liquid from the nozzle 6.

The actuator substrate 10 further includes partition walls 4, pressure chambers 5, fluid restrictors 7, and common channels 9. The partition walls 4 serve as pressure-chamber partition walls. Each pressure chamber 5 is partitioned by the partition walls 4.

The sub-frame substrate 20 includes a supply port 66, a through hole 67, and a gap. The supply port 66 supplies the liquid to the head 100 from an exterior of the head 100. The through hole 67 communicates with the supply port 66. The gap is formed in the sub-frame substrate 20 to enable the diaphragm 3 to bend. The through hole 67 communicates with a through hole of the actuator substrate 10.

The nozzle substrate 30, the actuator substrate 10, and the sub-frame substrate 20 are bonded to form the head 100.

The head 100 is to be dischargeable the liquid in a direction perpendicular to the nozzle surface 32 (discharge surface) of the nozzle substrate 30. That is, the head 100 is to be dischargeable the liquid in a direction perpendicular to a recording surface of a recording medium disposed parallel to the nozzle surface 32 (discharge surface). For example, streaks may be formed in an image on the recording medium so that image quality of the image on the recording medium may be deteriorated when the liquid is obliquely discharged by the head 100 of the printer 500 (inkjet recording apparatus). A shape or the like of the nozzle 6 as the discharge port of a liquid droplet (ink droplet) is configured to prevent an occurrence of such a problem of an oblique discharge in the present embodiment.

FIG. 2 is a schematic cross-sectional view of the nozzle substrate 30 and the nozzle 6.

The head 100 according to the first embodiment has the nozzle 6 having a stepped shape (having two stages) such that the nozzle 6 has two different cross-sectional areas of cylinders formed by inner wall surfaces 31*a* and 31*b* of the nozzle 6 as illustrated in FIG. 2. Specifically, the nozzle 6 includes an upper cylinder having a diameter "Wb" and a lower cylinder having a diameter "Wa". The upper cylinder is formed by an inner wall surface 31*b*, and the lower cylinder is formed by an inner wall surface 31*a* as illustrated in FIG. 2. The inner wall surfaces 31*a* and 31*b* of the nozzle 6 are collectively referred to as a "inner wall surface 31".

The smaller the diameter "Wa" of the nozzle 6 in the discharge direction (downward direction in FIG. 2), the smaller (more minute) the ink droplet dischargeable from the nozzle 6. Thus, the head 100 can improve a resolution of the image and form a high-quality image.

Conversely, if a volume in an interior of the nozzle 6 is small, a fluid resistance of the nozzle 6 increases that reduce a degree of freedom of a discharge control of the liquid. Thus, the head 100 includes an introduction portion having a diameter "Wb" larger than the diameter "Wa" of the nozzle 6 to reduce a fluid resistance of the nozzle 6.

Factors of a nozzle shape to vertically discharge a liquid droplet (ink droplet) include: (A) the nozzle 6 is formed vertically with respect to the nozzle substrate 30, (B) a cross-sectional shape of the nozzle 6 in a plan view is a perfect circle, and (C) the inner wall surface 31 of the nozzle 6 is smooth.

Examples of a method of forming the nozzle 6 include a press method of forming holes in the nozzle substrate 30 by pressing if the nozzle substrate 30 is a metal plate. If the nozzle substrate 30 is a Si substrate, a dry etching method in which holes are formed by etching may be used.

The dry etching method is superior in terms of high controllability of the shape of the nozzle 6.

Examples of the dry etching method include ion-assisted anisotropic etching and anisotropic etching using the Bosch process. A former method (ion-assisted anisotropic etching) has a characteristic in which a size of a diameter of an etched hole decreases with an increase in a depth of the hole. A latter method (anisotropic etching using the Bosch process) has a characteristic in which a hole can be vertically formed while maintaining a size of the diameter with an increase in a depth of the hole. Therefore, the nozzle 6 is preferably formed by dry etching using the Bosch process.

Adoption of the etching method having higher perpendicularity of the inner wall surface 31 of the nozzle 6, such as the Bosch method, can reduce bending of a liquid droplet discharged from the nozzle 6.

FIG. 3 is a cross-sectional side view of the nozzle substrate 30 including the nozzle 6. FIG. 3 illustrates a meniscus in the nozzle 6.

There is a difference "m1" between a meniscus "M1" formed at a position close to the nozzle surface 32 (discharge port) and a meniscus "M2" formed at a position retracted toward the pressure chamber 5 at a center of the nozzle 6 as illustrated in FIG. 3. The difference m1 increases with an increase in a length of the nozzle 6. Thus, there is a problem of a decrease in a returning speed of the meniscus and a decrease in a response frequency.

Figure 4:
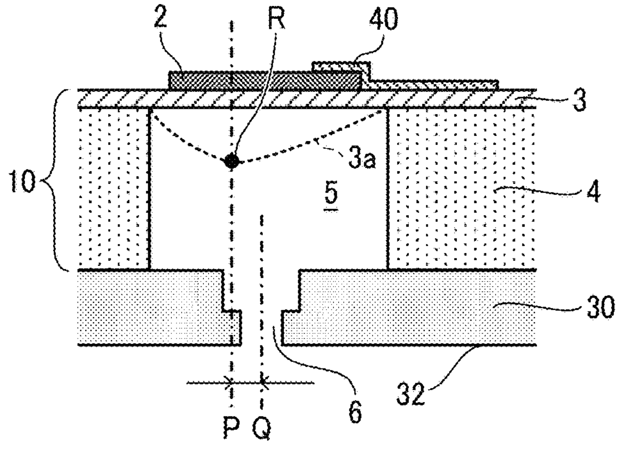
FIG. 4 is a cross-sectional side view of a liquid discharge head according to a comparative example along a longitudinal direction of a pressure chamber.
Figure 5:
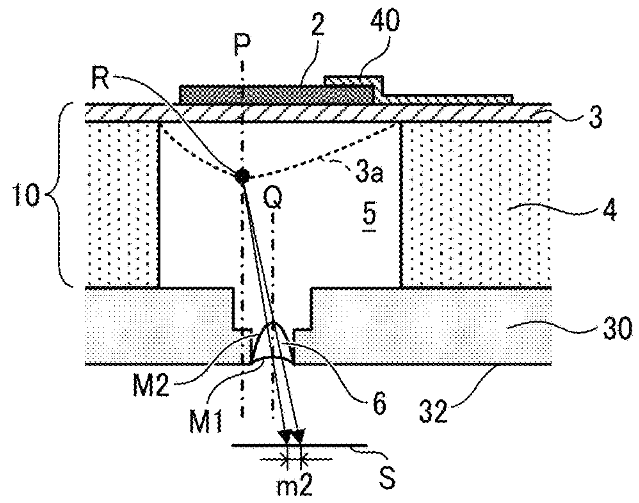
FIG. 5 is a cross-sectional side view of a liquid discharge head according to a comparative example along the longitudinal direction of the pressure chamber.

FIGS. 4 and 5 are cross-sectional side views of a head according to a comparative example along a longitudinal direction of the pressure chamber 5.

The piezoelectric element 2 (actuator) serves as a pressure generator to deform the diaphragm 3. The piezoelectric element 2 has a restriction portion in which a deformation of the piezoelectric element 2 is restricted by a wiring layer 40 such as an electrode. Thus, a deformation of the diaphragm 3 received by the piezoelectric element 2 may not be symmetrical in a lateral direction and in a vertical direction. A deformation region "3*a*" is indicated by a broken line in FIG. 4. The deformation region "3*a*" schematically illustrates a state in which the diaphragm 3 is deformed.

As illustrated in FIGS. 4 and 5, a right end of the piezoelectric element 2 is in the restriction state due to a contact of the wiring layer 40 of an upper electrode. Thus, a displacement center "R" of the diaphragm 3 in the deformation region 3*a* is shifted leftward from a central position of (based on) the piezoelectric element 2 and the pressure chamber 5. The diaphragm 3 deforms with a maximum displacement amount at the displacement center R.

Further, a virtual straight line "P" extends from the displacement center R in the liquid discharge direction (vertically downward direction in FIG. 4) does not coincident (match or align) with a central axis Q of the nozzle 6 as a discharge port and overlap with the nozzle substrate 30. The "virtual straight line P" is also referred to as a "first line P".

A central axis of the nozzle 6 is indicated by "Q" in a right side of a dash-single-dot line in FIGS. 4 and 5. The central axis Q of the nozzle 6 extends from a central position of the nozzle 6 in a vertical direction. The "central axis Q" is also referred to as a "second line Q".

A gap between the first line P (virtual straight line) and the second line Q (central axis) in a direction perpendicular to the liquid discharge direction (horizontal direction in FIG. 4) is, for example, about 65 μm in FIGS. 4 and 5.

The displacement center R is a position indicating the maximum displacement amount of an amplitude of diaphragm 3. The displacement center R can be indicated by dots in a cross-section in a transverse direction and in a longitudinal direction of the diaphragm 3.

FIG. 5 is a cross-sectional side view of the head according to the comparative example illustrating the deformation region 3*a* with the menisci M1 and M2.

If the ink is discharged in this state illustrated in FIG. 5 in which there is the gap between the first line P (virtual straight line) and the second line Q (central axis), a direction of pressure that propagates from the displacement center R to the center of the meniscus changes according to a change in a position of the meniscus between the meniscus M1 and the meniscus M2. Thus, a liquid discharge direction of the generated ink droplets deviates from a head vertical direction perpendicular to the nozzle surface 32 of the head 100 as illustrated in FIG. 5. Thus, the liquid discharge direction of the head 100 in FIG. 5 is inclined with respect to the head vertical direction.

The position of the meniscus changes between the meniscus M1 and the meniscus M2 so that a difference "m2" occurs on a recording medium S as a discharge surface as illustrated in FIG. 5.

Figure 9:
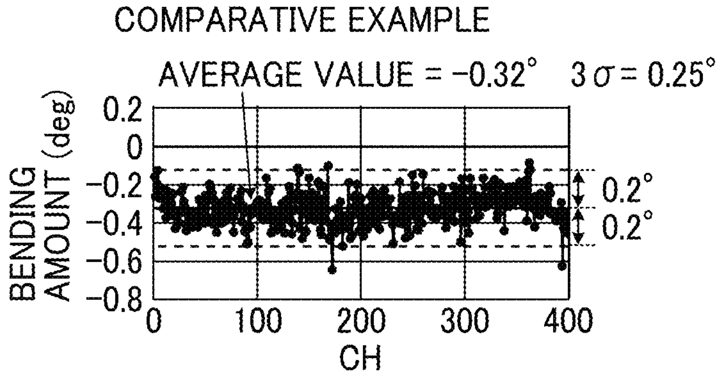
FIG. 9 is a graph illustrating a result of measurement of a discharge bending amount of the liquid discharge head according to the comparative example.

FIG. 9 is a graph illustrating a result of measurement of a discharge bending amount of the head according to the comparative example. The discharge bending amount is a difference of the discharged droplet on the recording medium S between the meniscus M1 and M2. Hereinafter, the "discharge bending amount" is simply referred to as a "bending amount" in FIG. 9.

The bending amount was measured under following conditions by a binarization processing program "SOGAS$^{SM}$" using a particle forming apparatus for capturing discharged images. The binarization processing program "SOGAS$^{SM}$" is used for calculating a center of gravity of the discharged droplets.

Driving conditions: 10 kHz Waveform: simple PULL waveform Temperature: 23° C. Stage-by-stage driving (four stages/column×two columns=eight stages)

As a result of measurement, an average value of the discharge deflection amount was −0.32°, and 3σ was 0.25°.

The above configuration has a large bending amount of discharged ink and a large overall variation in the bending amount that may cause a deterioration in a formed image on the recording medium S.

Figure 6A:
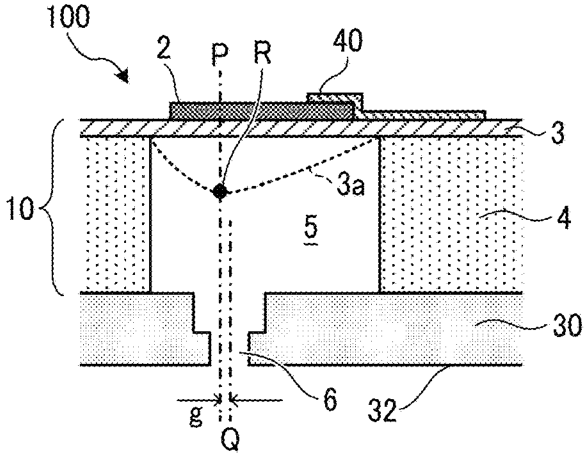
FIGS. 6A and 6B are cross-sectional side views of the pressure chamber of the liquid discharge head according to the first embodiment of the present disclosure.

FIG. 6A is a cross-sectional side view of the pressure chamber 5 of the head 100 according to the first embodiment of the present disclosure in a longitudinal direction of the pressure chamber 5.

Figure 6B:
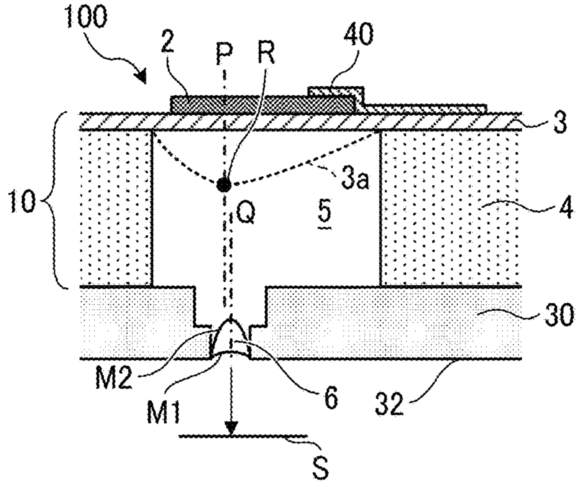

FIG. 6B is a cross-sectional side view of the head 100 according to the first embodiment illustrating the deformation region 3*a* with the menisci M1 and M2.

As illustrated in FIGS. 6A and 6B, the head 100 according to the first embodiment has the nozzle substrate 30, the pressure chamber 5, the diaphragm 3, and the piezoelectric element 2. The nozzle substrate 30 includes nozzles 6 to discharge a liquid on the nozzle surface 32. The pressure chamber 5 communicates with the nozzles 6. The diaphragm 3 forms a part of wall of the pressure chamber 5. The piezoelectric element 2 serves as a pressure generator.

The piezoelectric element 2 is formed on a back surface (upper surface in FIGS. 6A and 6B) of the diaphragm 3 opposite to a surface (lower surface in FIGS. 6A and 6B) of the diaphragm 3 facing the pressure chamber 5. The piezoelectric element 2 apply pressure on the liquid in the pressure chamber 5. The head 100 discharges a liquid to which a pressure is applied by the piezoelectric element 2 from the nozzles 6 as a liquid droplet.

A gap "g" indicated in FIG. 6A is a distance between a first line (left dash-single-dot line) and a second line (right dash-single-dot line) in a direction perpendicular to the liquid discharge direction (lateral direction or horizontal direction in FIG. 6A).

The first line P extends from the displacement center R indicating the maximum displacement amount of the deformation region 3*a* of the diaphragm 3 in a liquid discharge direction (vertically downward direction in FIG. 6A).

The second line Q (central axis) extends from a central position of the nozzle 6 in the liquid discharge direction. The central position of the nozzle 6 is at the central axis (second line Q) of nozzle 6 in FIGS. 6A and 6B. The gap "g" is 40 μm or less.

The gap "g" of 40 μm or less can reduce a positional deviation. The gap "g" is to be 20 μm or less. The gap "g" of 20 μm or less can further reduce the positional deviation.

The gap "g" (distance) between the first line and the second line in a direction (horizontal direction in FIG. 6A) perpendicular to the liquid discharge direction (vertical direction in FIG. 6A) may be a gap between first line P (virtual straight-line) and the second line Q (central axis). In the above-described comparative example, the gap between the first line P (virtual straight-line) and the second line Q (central axis) in FIGS. 4 and 5 is about 65 μm that is larger than the gap "g" in the head 100 according to the first embodiment of the present disclosure.

In the head 100 having the gap "g" of 40 μm or less, a direction of a pressure propagating from the displacement center R to the center of the meniscus does not change even if the position of the meniscus changes between the M1 and the M2. The head 100 having the gap "g" of 40 μm or less can reduce a change in the direction of the pressure propagating from the displacement center R to the center of the meniscus even if the position of the meniscus changes between the M1 and the M2.

Therefore, the liquid discharge direction of the ink droplet is not deviated from the head vertical direction perpendicular to the nozzle surface 32 of the head 100. As illustrated in FIG. 6B, a deviation does not occur in a liquid discharge position on the recording medium S even if the position of the meniscus changes between the meniscus M1 and the meniscus M2 (see FIG. 6B). The recording medium S serves as a discharge surface.

The displacement center R is within the nozzle 6 in a plan view of the nozzle substrate 30 in a direction opposite to the liquid discharge direction (viewed upward from a lower direction in FIGS. 6A and 6B). That is, the first line P (virtual straight-line) is disposed within an area of the nozzle 6 so that the first line P passes through the nozzle 6 as illustrated in FIGS. 6A and 6B.

The displacement center R of the deformation region 3*a* of the diaphragm 3 is aligned with a position of the nozzle 6 to obtain the head 100 according to the first embodiment without performing complicated processing in a manufacturing process of the head 100. The head 100 according to the first embodiment can reduce an occurrence of a discharge bending regardless of the positions of the meniscus in the nozzle 6 without using a complicated manufacturing process.

A distance between the displacement center R and the central position of the nozzle 6 may be 40 μm or less in the head 100 according to the first embodiment in a plan view of the head 100 seen from the liquid discharge direction. The displacement center R indicates the maximum displacement amount of the deformation region 3*a* of the diaphragm 3.

Next, the head 100 according to a second embodiment of the present disclosure (another example) is described below.

In the head 100 according to the second embodiment, the displacement center R may be disposed within the nozzle 6 in a plan view seen from the liquid discharge direction. The diaphragm 3 indicates the maximum deformation amount of the deformation region 3*a* at the displacement center R. The displacement center R and the position of the nozzle 6 may coincident (align or match) with each other in a plan view of the head 100 viewed in the discharge direction. The displacement center R indicates the maximum displacement amount of the deformation region 3*a* of the diaphragm 3.

Figure 7A:
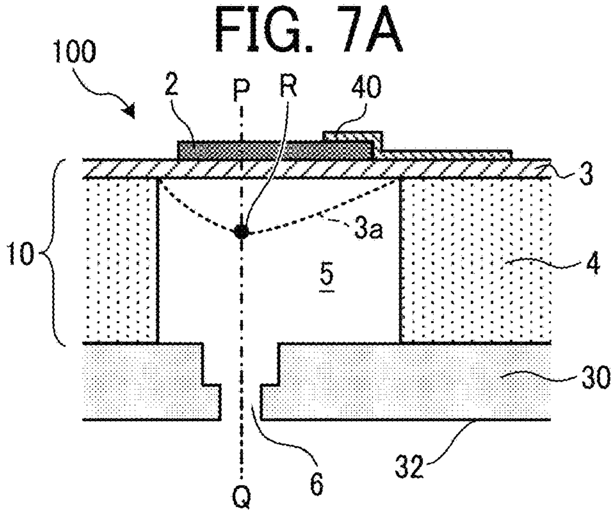
FIG. 7A is a schematic cross-sectional side view of the liquid discharge head according to a second embodiment.
Figure 8:
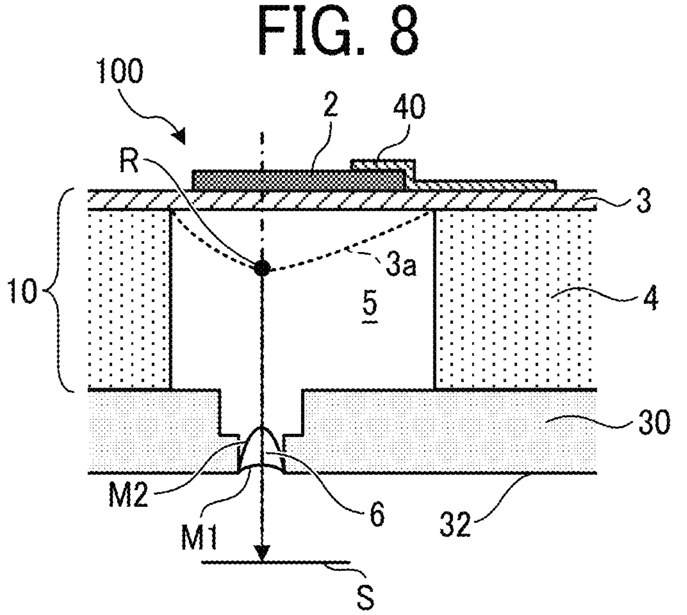
FIG. 8 is a schematic cross-sectional side view of the liquid discharge head according to the second embodiment illustrating the meniscus in the nozzle.

FIGS. 7A and 8 are schematic cross-sectional side views of the head 100 according to the second embodiment along a longitudinal direction of the pressure chamber 5 of the head 100.

Figure 7B:
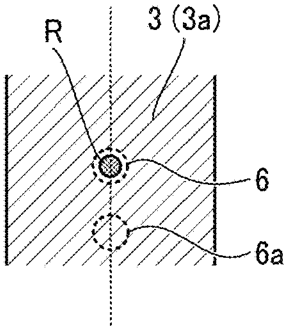
FIG. 7B is a schematic plan view of a diaphragm of the liquid discharge head according to the second embodiment of the present disclosure.

FIG. 7B is a schematic plan view of the diaphragm 3 of the head 100 in the liquid discharge direction from the nozzle 6 (nozzle surface 32). In FIG. 7B, the position of the nozzle 6*a* of the bead according the comparative example is indicated by a dashed circle.

As illustrated in FIGS. 7B and 8, the displacement center R and the position of the nozzle 6 coincident (align or match) with each other in a plan view of the head 100 in the liquid discharge direction from the nozzle 6 (nozzle surface 32) in the head 100 according to the second embodiment. The displacement center R indicates the maximum displacement amount of the deformation region 3*a* of the diaphragm 3.

The term "plan view" refers to a plan view of the head 100 in the liquid discharge direction from the nozzle 6 (nozzle surface 32).

FIG. 8 is a cross-sectional side view of the head 100 according to the second embodiment illustrating the deformation region 3*a* with the menisci M1 and M2.

In the head 100 according to the second embodiment, the direction of the pressure propagating from the displacement center R to the center of the meniscus does not change even if the position of the meniscus changes between the M1 and the M2. Therefore, the liquid discharge direction of the ink droplet is not deviated from the head vertical direction perpendicular to the nozzle surface 32 of the head 100.

As illustrated in FIG. 8, the deviation does not occur in the liquid discharge position on the recording medium S even if the position of the meniscus changes between the meniscus M1 and the meniscus M2 (see FIG. 6B). The recording medium S serves as a discharge surface.

The displacement center R of the deformation region 3*a* of the diaphragm 3 is aligned with the position of the nozzle 6 to obtain the head 100 according to the second embodiment without performing complicated processing in the manufacturing process of the head 100. The head 100 according to the second embodiment can reduce the occurrence of the discharge bending regardless of the positions of the meniscus in the nozzle 6.

The first line P (virtual straight-line) extending from the displacement center R of the diaphragm 3 and the second line Q (central axis) extending from the central position of the nozzle 6 may be coincident (align or match) with each other in the head 100 according to the second embodiment.

That is, the first line P (virtual straight-line) extends from the displacement center R in the liquid discharge direction (first line) and the second line Q (central axis) of the nozzle 6 may coincident (align or match) with each other. The head 100 according to the second embodiment having the above configuration can further reduce the occurrence of discharge bending. The first line P (virtual straight-line) extends from the displacement center R in the liquid discharge direction (vertical direction in FIG. 7A)

Figure 10:
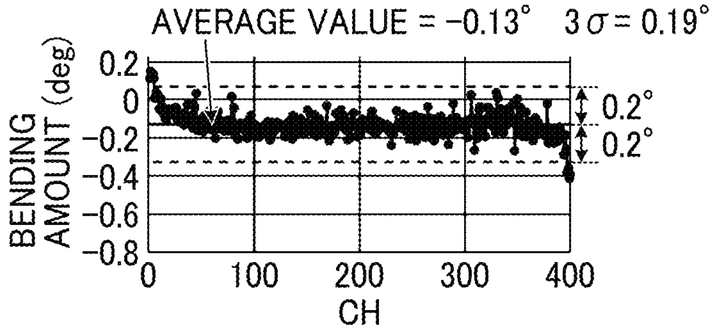
FIG. 10 is a graph illustrating a result of measurement of a discharge bending amount of the liquid discharge head according to the second embodiment.

FIG. 10 is a graph illustrating a result of measurement of a discharge bending amount of the bead 100 according to the second embodiment. The discharge bending amount is a difference of the discharged droplet on the recording medium S between the meniscus M1 and M2.

The measurement was performed in the same manner as the measurement in the head according to the comparative example as illustrated in FIG. 9.

As a result of measurement, an average value of the discharge bending amount was −0.13°, and 3σ (three-sigma value) was 0.19°.

In the above-described way, the head 100 according to the second embodiment can reduce the bending amount and the overall variation in the bending amount so that the head 100 can form a high-quality image.

At this time, the gap "g" between the first line P (virtual straight-line extended from the displacement center R of the diaphragm 3) and the second kine Q (central axis extended from the central position of nozzle 6) was 5 μm.

Similarly, the above measurement was also performed on the head 100 having the gap "g" between the first line P (virtual straight line extended from the displacement center R of the diaphragm 3) and the second line Q (central axis extended from the central position of the nozzle 6) of 20 μm. As a result, the average value of the bending amount was −0.23°. Thus, it is observed that a reduction of the gap can reduce the positional deviation.

Figure 19:
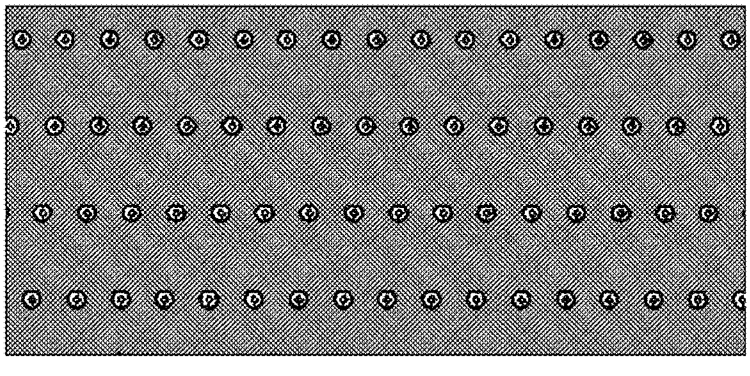
FIG. 19 illustrates an example of a matrix arrangement of the nozzles.

The head 100 according to the second embodiment includes multiple nozzles 6 arrayed in a matrix form. FIG. 19 illustrates an example of a matrix arrangement of the nozzles 6.

The multiple nozzles 6 arrayed in the matrix form can increase a nozzle density and reduce crosstalk. Further, the head 100 having the multiple nozzles 6 arrayed in the matrix form can reduce a size of the head 100.

[Head Module]

Figure 17:
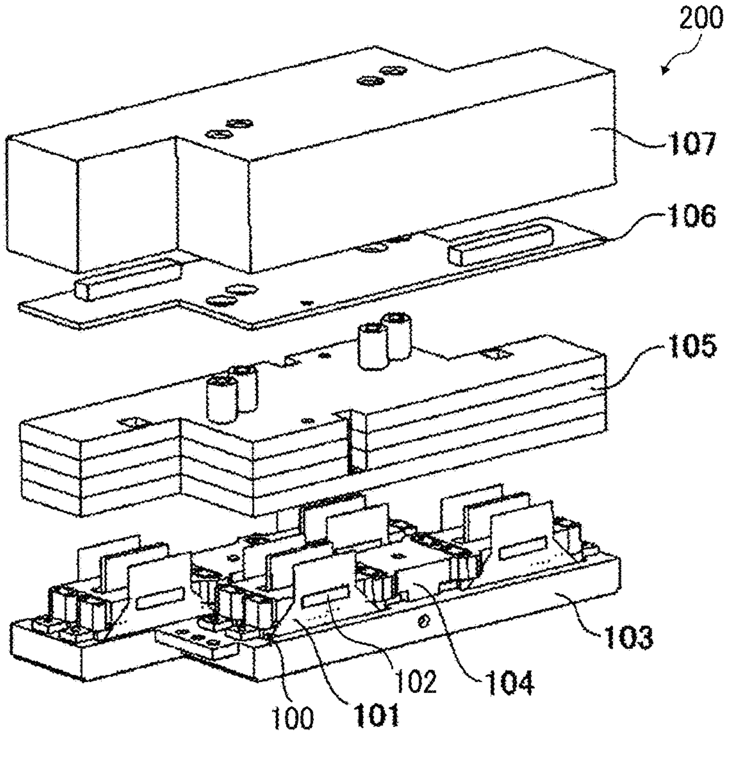
FIG. 17 is a schematic exploded perspective view of an example of a head module.
Figure 18:
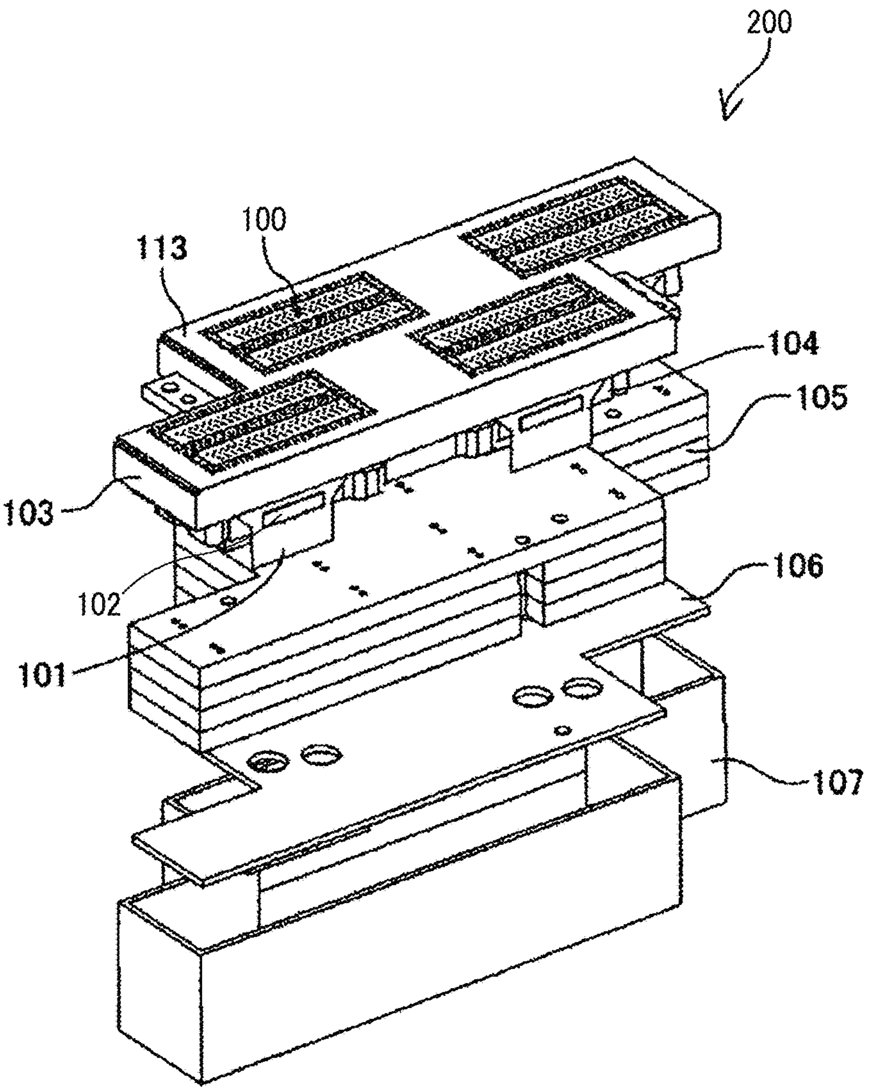
FIG. 18 is a schematic exploded perspective view of an example of a head module viewed from a nozzle surface.

FIGS. 17 and 18 illustrate an example of a head module according to an embodiment of the present disclosure.

FIG. 17 is an exploded perspective view of the head module 200.

FIG. 18 is an exploded perspective view of the head module 200 viewed from a cover 113 of the head module 200.

The head module 200 according to the present embodiment includes multiple heads 100 as described in the above embodiments. The multiple heads 100 are arrayed in staggered manner on the cover 113 as illustrated in FIG. 18.

The head module 200 includes multiple heads 100 to discharge a liquid, a base 103 holding the multiple heads 100, and the cover 113 serving as a nozzle cover of the multiple heads 100.

Further, the head module 200 includes a heat radiator 104, a manifold 105 forming a channel to supply liquid to the multiple heads 1, a printed circuit board 106 (PCB) coupled to a flexible wiring 101, and a module case 107. A head driver 102 (driver IC) is mounted on the flexible wiring 101.

[Head Device, Liquid Discharge Device, and Liquid Discharge Apparatus]

The printer 500 serving as a liquid discharge apparatus according to an embodiment of the present disclosure is described in detail below with reference to FIG. 11. An example of the head device is described with reference to FIG. 12.

Figure 11:
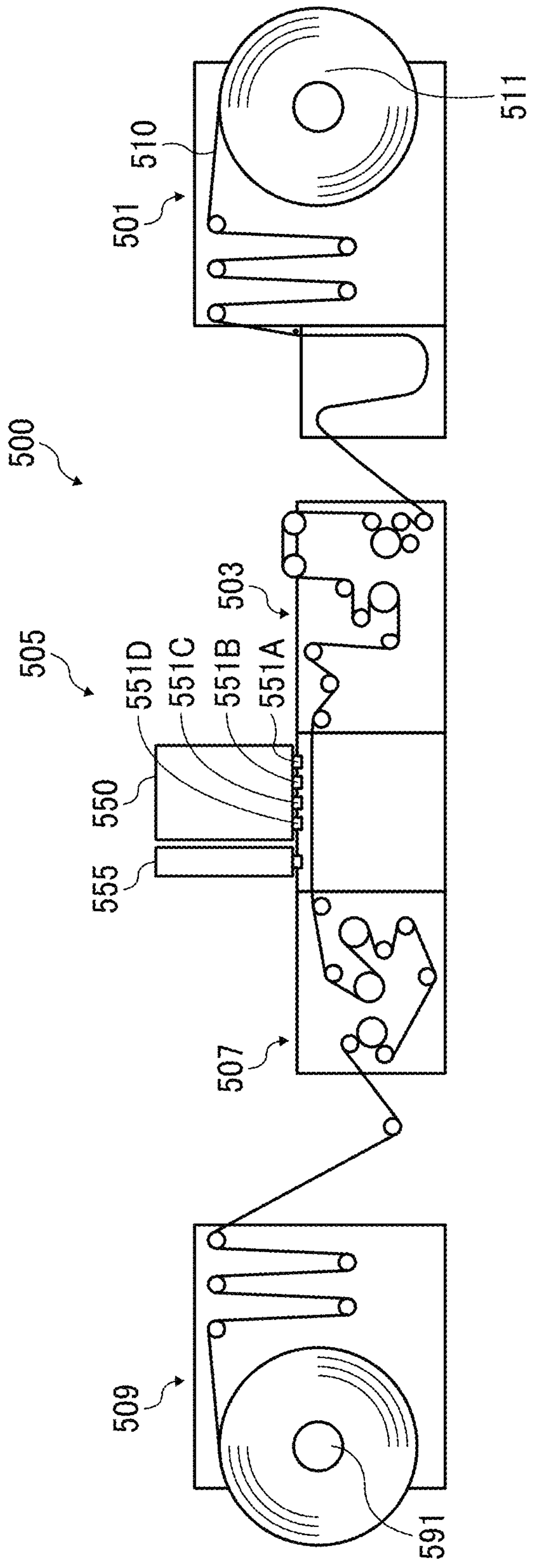
FIG. 11 is a side view of a liquid discharge apparatus according to an embodiment of the present disclosure.

FIG. 11 is a schematic cross-sectional view of the printer 500 as the liquid discharge apparatus according to the present embodiment.

Figure 12:
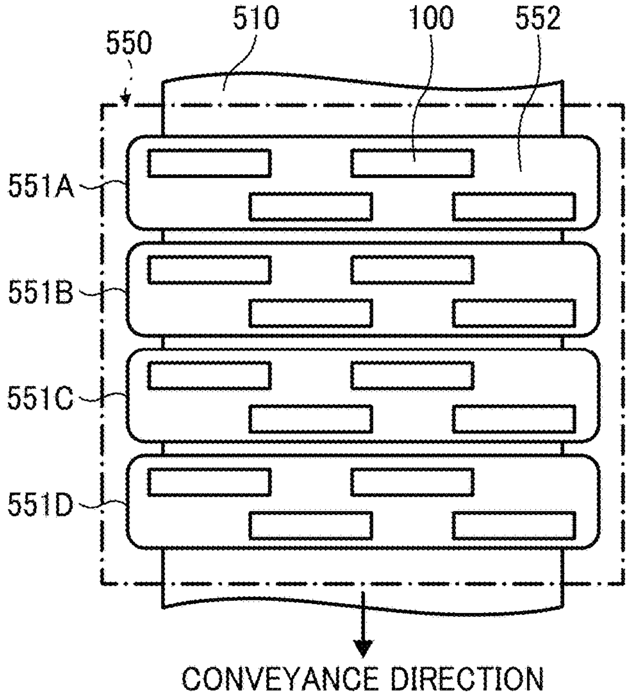
FIG. 12 is a plan view of a head device of the liquid discharge apparatus of FIG. 11.

FIG. 12 is a plan view of the head device of the printer 500 (liquid discharge apparatus) of FIG. 11 according to the present embodiment.

The printer 500 (liquid discharge apparatus) according to the present embodiment includes the head 100 or the liquid discharge device according to the present embodiment.

The printer 500 serving as the liquid discharge apparatus includes a feeder 501, a guide conveyor 503, a printing device 505, a dryer 507, and an ejector 509. The feeder 501 feeds a continuous medium 510 such as a continuous paper or a roiled sheet and as a recording medium. The guide conveyor 503 guides and conveys the continuous medium 510, fed from the feeder 501, to the printing device 505. The printing device 505 discharges a liquid onto the continuous medium 510 to form an image on the continuous medium 510. The dryer 507 dries the continuous medium 510. The ejector 509 ejects the continuous medium 510.

The continuous medium 510 is fed from a winding roller 511 of the feeder 501, guided and conveyed with rollers of the feeder 501, the guide conveyor 503, the dryer 507, and ejector 509, and wound around a take-up roller 591 of the ejector 509.

In the printing device 505, the continuous medium 510 is conveyed on a conveyance guide to face a head device 550 and a head device 555. An image is formed with the liquid discharged from the head device 550, and a post-processing is performed with a treatment liquid discharged from the head device 555.

The head module 200 according to the present embodiment includes multiple heads 100 as described in the above embodiments. The multiple heads 100 are arrayed in staggered manner in the head module 200 as illustrated in FIG. 18.

Here, the first head device 550 includes, for example, four color full-line head arrays 551A, 551B, 551C, and 551D from the upstream side in the conveyance direction (a direction from right to left in FIG. 11) of the continuous medium 510. Hereinafter, the full-line head arrays 551A, 551B, 551C, and 551D are simply referred to as "head arrays 551" when colors are not distinguished. Each of the head array 551 may be a head module 200 as illustrated in FIGS. 17 and 18. Thus, the head device 550 includes multiple head modules 200.

Each of the head arrays 551 is a liquid discharge device to discharge liquid of black (K), cyan (C), magenta (M), and yellow (Y) onto the continuous medium 510 conveyed in the conveyance direction of the continuous medium 510. Note that number and types of color are not limited to the above-described four colors of K, C, M, and Y and may be any other suitable number and types.

In each head arrays 551, for example, as illustrated in FIG. 12, the heads 100 are staggered on a base 552 to form the head array 551. Note that the configuration of the head array 551 is not limited to such a configuration. The head 100 has a configuration of one of the head 100 illustrated in FIGS. 1 to 8.

Next, another example of a printer 500 serving as a liquid discharge apparatus according to another embodiment of the present disclosure is described with reference to FIGS. 13 and 14.

Figure 13:
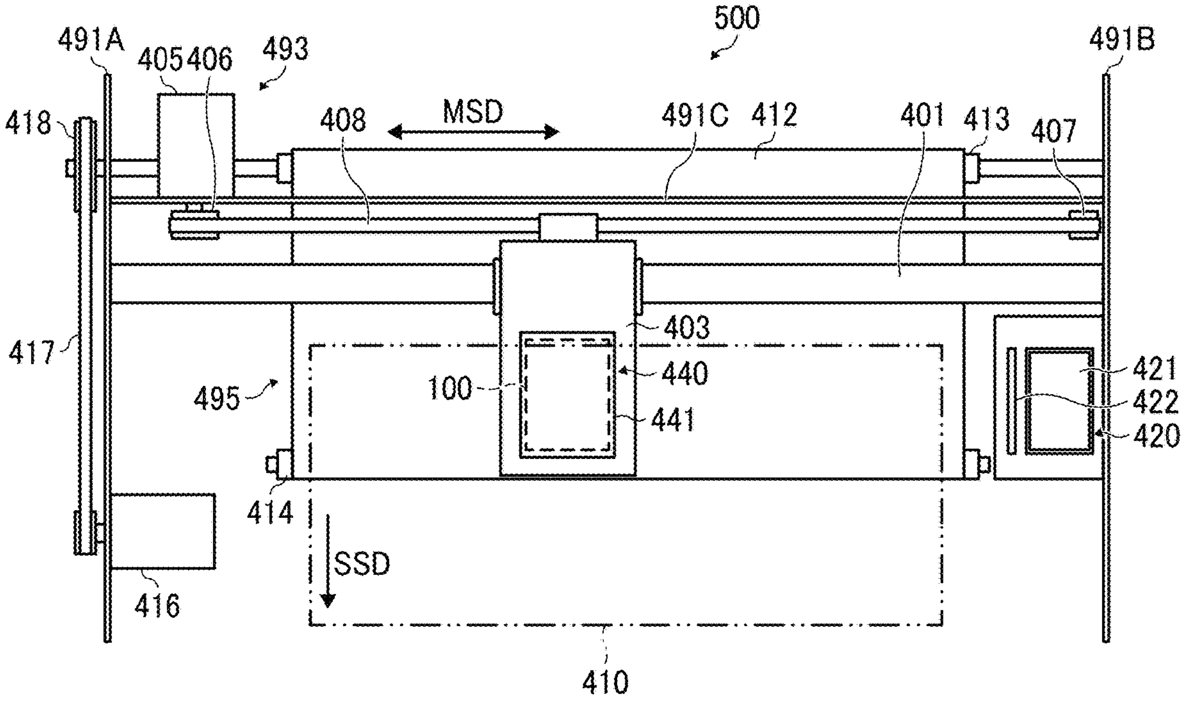
FIG. 13 is a plan view of a main part of a liquid discharge apparatus according to another embodiment of the present disclosure.

FIG. 13 is a plan view of a portion of the printer 500.

Figure 14:
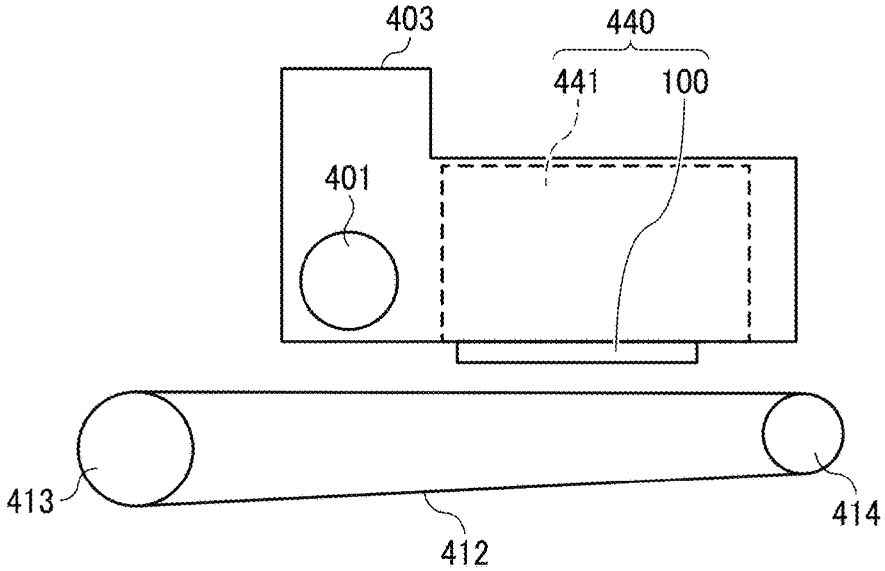
FIG. 14 is a schematic side view of a main part of the liquid discharge apparatus of FIG. 13.

FIG. 14 is a side view of a portion of the printer 500 of FIG. 13.

The printer 500 is a serial-type inkjet recording apparatus, and a carriage 403 is reciprocally moved in a main scanning direction indicated by arrow "MSD" in FIG. 13 by a main scan moving unit 493. The main scan moving unit 493 includes a guide 401, a main scan motor 405, a timing belt 408, and the like. The guide 401 is bridged between a left-side plate 491A and a right-side plate 491B to movably hold the carriage 403. The main scan motor 405 reciprocally moves the carriage 403 in the main scanning direction MSD via the timing belt 408 bridged between a drive pulley 406 and a driven pulley 407.

The carriage 403 mounts a liquid discharge device 440. The head 100 and a head tank 441 forms the liquid discharge device 440 as a single unit. The head 100 has a configuration of one of the head 100 illustrated in FIGS. 1 to 8.

The head 100 of the liquid discharge device 440 discharges color liquids of, for example, yellow (Y), cyan (C), magenta (M), and black (K). The head 100 includes a nozzle array including the nozzles 6 arrayed in row in a sub scanning direction indicated by arrow "SSD" perpendicular to the main scanning direction MSD in FIG. 13. The head 100 is mounted to the carriage 403 so that liquid droplets (ink droplets) are discharged downward from the nozzles 6.

The printer 500 includes a conveyor 495 to convey a sheet 410. The conveyor 495 includes a conveyance belt 412 as a conveyor and a sub scan motor 416 to drive the conveyance belt 412.

The conveyance belt 412 attracts the sheet 410 and conveys the sheet 410 at a position facing the head 100. The conveyance belt 412 is an endless belt stretched between a conveyance roller 413 and a tension roller 414. Attraction of the sheet 410 to the conveyance belt 412 may be applied by electrostatic adsorption, air suction, or the like.

The conveyance belt 412 rotates in the sub scanning direction SSD as the conveyance roller 413 is rotationally driven by the sub scan motor 416 via the timing belt 417 and the timing pulley 418.

At one side in the main scanning direction MSD of the carriage 403, a maintenance unit 420 to maintain the head 100 in good condition is disposed on a lateral side (right side in FIG. 13) of the conveyance belt 412.

The maintenance unit 420 includes, for example, a cap 421 to cap a nozzle surface 32 of the head 100, a wiper 422 to wipe the nozzle surface 32, and the like. The nozzle surface 32 is an outer surface of the nozzle substrate 30 (see FIG. 1) on which the nozzles 6 are formed.

The main scan moving unit 493, the maintenance unit 420, and the conveyor 495 are mounted to a housing that includes the left-side plate 491A, the right-side plate 491B, and a rear-side plate 491C.

In the printer 500 thus configured, the sheet 410 is conveyed on and attracted to the conveyance belt 412 and is conveyed in the sub scanning direction SSD by a cyclic rotation of the conveyance belt 412.

The head 100 is driven in response to image signals while the carriage 403 moves in the main scanning direction MSD, to discharge liquid to the sheet 410 stopped, thus forming an image on the sheet 410.

Next, the liquid discharge device 440 according to another embodiment of the present disclosure is described with reference to FIGS. 15 and 16.

The printer 500 (liquid discharge apparatus) according to another embodiment includes the head 100 or the liquid discharge device 440 according to the present embodiment.

Further, the liquid discharge device 440 includes the head 100 and at least one of: a head tank 441 that stores liquid to be supplied to the head 100; a carriage 403 on which the head 100 is mounted; a supply unit that supplies the liquid to the head 100; a maintenance unit 420 that maintains the head 100; and a main scan moving unit 493 to move the head 100 in the main scanning direction MSD to form a single unit.

Figure 15:
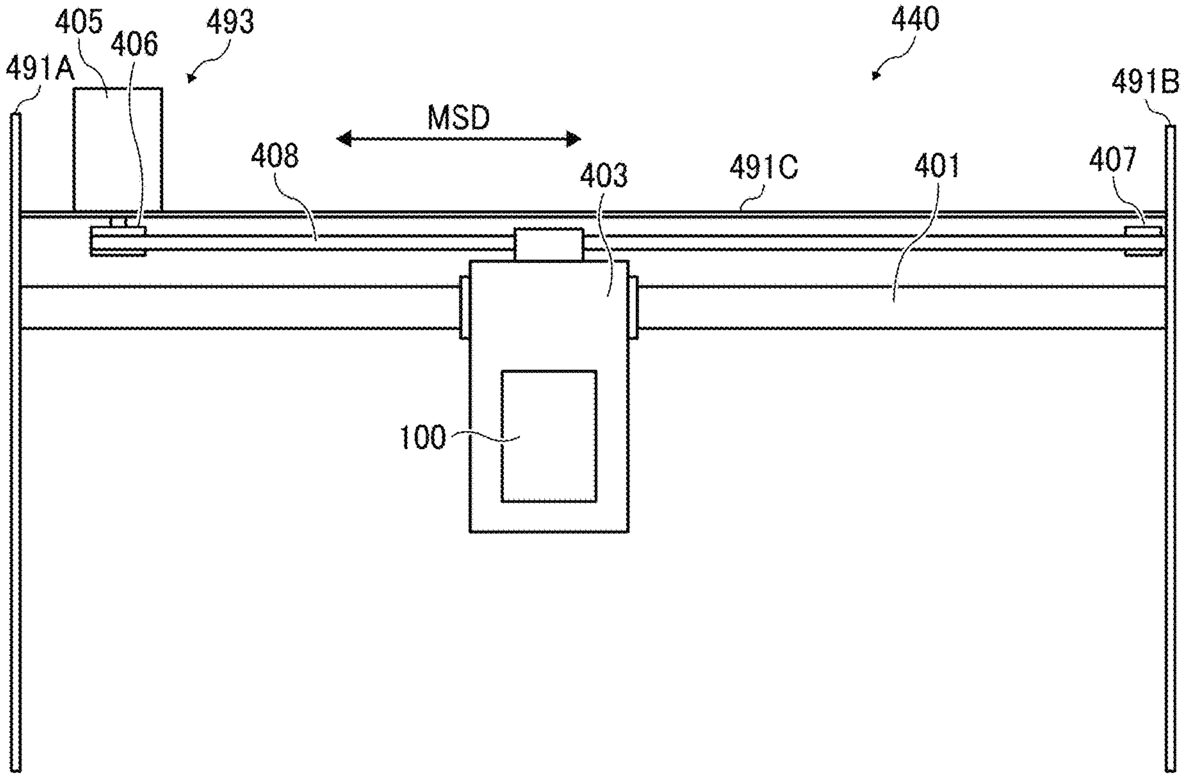
FIG. 15 is a schematic plan view of a main part of a still another example of a liquid discharge device.

FIG. 15 is a schematic plan view of a main part of a still another example of a liquid discharge device 440.

The liquid discharge device 440 includes a housing, the main scan moving unit 493, the carriage 403, and the head 100 among components of the printer 500 in FIG. 13. The left-side plate 491A, the right-side plate 491B, and the rear-side plate 491C constitute the housing.

Note that, in the liquid discharge device 440, the maintenance unit 420 described above may be mounted on the right-side plate 491B, for example.

Figure 16:
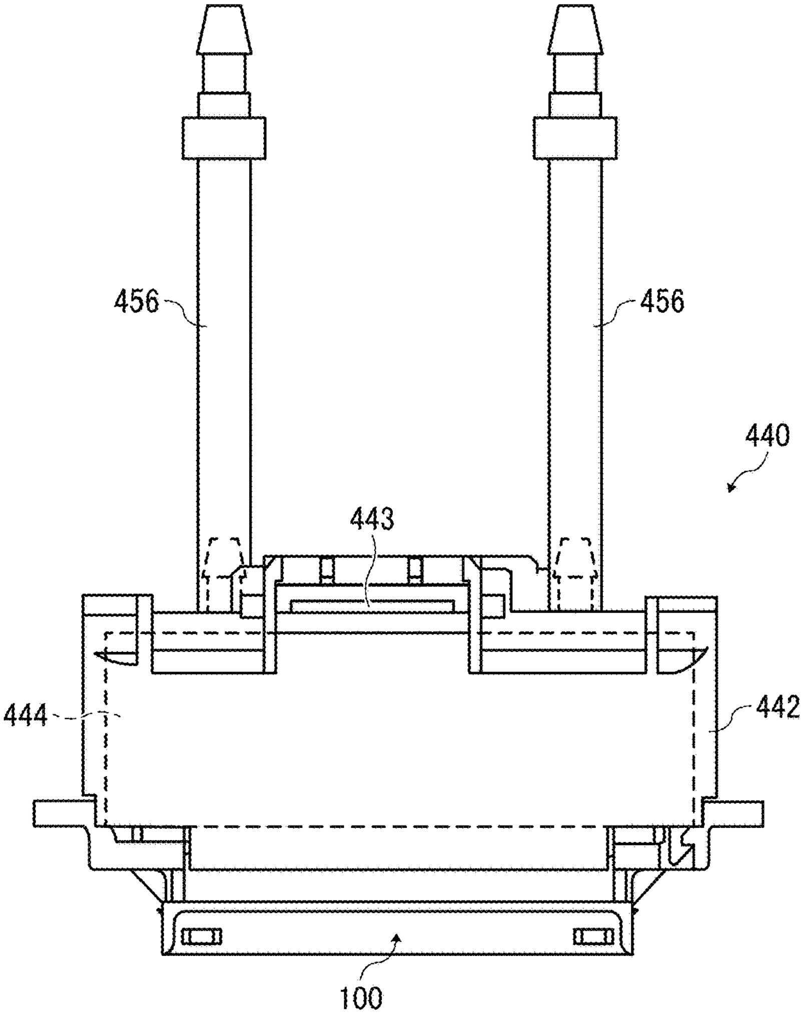
FIG. 16 is a front view of a still another example of the liquid discharge device.

FIG. 16 is a front view of still another example of the liquid discharge device 440.

The liquid discharge device 440 includes the head 100 to which a channel part 444 is attached, and a tube 456 connected to the channel part 444.

Further, the channel part 444 is disposed inside a cover 442. In some embodiments, the liquid discharge device 440 may include the head tank 441 described above instead of the channel part 444. A connector 443 electrically connected with the head 100 is provided on an upper part of the channel part 444.

In the present disclosure, the "liquid discharge apparatus" includes the head or the liquid discharge device and drives the head to discharge liquid. The liquid discharge apparatus may be, for example, an apparatus capable of discharging liquid to a material to which liquid can adhere or an apparatus to discharge liquid toward gas or into liquid.

The "liquid discharge apparatus" may include units to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to forum an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid is adhered, unless particularly limited.

Examples of the "material on which liquid can adhere" include any materials on which liquid can adhere even temporarily, such as paper, thread, fiber, fabric, leather, metal, plastic, glass, wood, and ceramic.

Further, "liquid" discharged from the head is not particularly limited as long as the liquid has a viscosity and surface tension of degrees dischargeable from the head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet surface to coat the sheet with the treatment liquid to reform the sheet surface and an injection granulation apparatus to discharge a composition liquid including a raw material dispersed in a solution from a nozzle to mold particles of the raw material.

The head 100 according to embodiments as described above has a configuration in which the first line P (line extended from the displacement center R of the diaphragm 3 in the discharge direction) and the second lined (central axis Q extended from the central position of the nozzle 6 in the discharge direction) are aligned (matched). Thus, the head 100 can efficiently apply a pressure in a vertical direction generated by a displacement of the diaphragm 3 to the meniscus. Thus, the head 100 can reduce an occurrence of a discharge bending regardless of the positions of the meniscus in the nozzle 6 without using a complicated manufacturing process.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle substrate having multiple nozzles from each of which a liquid is discharged in a liquid discharge direction, the multiple nozzles being arranged in a nozzle array direction;

a pressure chamber communicating with the nozzle, the pressure chamber being in a rectangular shape having a longitudinal side and a traverse side;

a diaphragm defining a part of wall of the pressure chamber; and a pressure generator on a first surface of the diaphragm opposite to a second surface of the diaphragm facing the pressure chamber, the pressure generator configured to deform the diaphragm, wherein a gap between a first line and a second line in a longitudinal direction of the pressure chamber is 40 μm or less, the longitudinal direction is parallel to the longitudinal side of the pressure chamber and perpendicular to each of the liquid discharge direction and the nozzle array direction, where the first line extends, in the liquid discharge direction, from a displacement center at which the diaphragm deforms with a maximum displacement amount; and the second line extends from a central position of the nozzle in the liquid discharge direction.

2. The liquid discharge head according to claim 1, wherein the displacement center is within the nozzle in a plan view of the nozzle substrate.

3. The liquid discharge head according to claim 1, wherein the first line passes through the nozzle.

4. The liquid discharge head according to claim 1, wherein the gap is 20 μm or less.

5. The liquid discharge head according to claim 4, wherein the first line and the second line are coincident with each other.

6. The liquid discharge head according to claim 1, wherein the nozzle substrate includes multiple nozzles arrayed in a matrix form.

7. A head module comprising the liquid discharge head according to claim 1, wherein the liquid discharge head includes multiple liquid discharge heads.

8. A head device comprising the head module according to claim 7, wherein the head module includes multiple head modules.

9. A liquid discharge device comprising:

the liquid discharge head according to claim 1; and a carriage to movably hold the liquid discharge head.

10. The liquid discharge device according to claim 9, further comprising at least one of:

a head tank to store the liquid to be supplied to the liquid discharge head;

a supplier to supply the liquid to the liquid discharge head;

a maintenance structure to maintain the liquid discharge head; or a main scan mover to reciprocally move the carriage in a main scanning direction.

11. A liquid discharge apparatus comprising:

the liquid discharge head according to claim 1; and a conveyor to convey a sheet to a position facing the liquid discharge head.

* * * * *